United States Patent [19]

Heeb

[11] Patent Number: 5,522,613
[45] Date of Patent: Jun. 4, 1996

[54] SELF LUBICATING FIFTH WHEEL HITCH

[75] Inventor: John P. Heeb, Fennville, Mich.

[73] Assignee: Holland Hitch Company, Holland, Mich.

[21] Appl. No.: 314,410

[22] Filed: Sep. 28, 1994

[51] Int. Cl.⁶ .............................. B62D 53/08; F16C 17/04
[52] U.S. Cl. .............................................. 280/433; 384/421
[58] Field of Search ....................... 280/433, 438.1, 280/441.1; 384/421

[56] References Cited

U.S. PATENT DOCUMENTS

| | | | |
|---|---|---|---|
| 2,508,610 | 5/1950 | Kendall | 384/421 |
| 3,174,812 | 3/1965 | Widmer | 384/421 |
| 3,257,969 | 6/1966 | Thomas | 384/421 |
| 3,275,390 | 9/1966 | Franks | 280/433 |
| 3,337,277 | 8/1967 | Arnold | 280/433 |
| 3,451,731 | 6/1969 | Weichsel | 384/125 |
| 3,511,523 | 5/1970 | Fuller | 280/433 |
| 3,704,924 | 12/1972 | Lowry | 308/136 |
| 3,887,251 | 6/1975 | McKay | 384/421 |
| 3,924,909 | 12/1975 | Kent et al. | 280/433 |
| 4,045,854 | 9/1977 | Burton | 280/433 |
| 4,121,853 | 10/1978 | McKay | 280/433 |
| 4,169,635 | 10/1979 | Szalay et al. | 308/136 |
| 4,457,531 | 7/1984 | Hunger | 280/433 |
| 4,542,912 | 9/1985 | St. Louis | 280/433 |
| 4,752,081 | 6/1988 | Reeners et al. | 280/433 |
| 4,805,926 | 2/1989 | Mamery | 280/433 |
| 4,913,263 | 4/1990 | Spiers | 184/105 |
| 5,066,035 | 11/1991 | Athane et al. | 280/441 |
| 5,165,713 | 11/1992 | Picard | 280/433 |
| 5,165,714 | 11/1992 | Kaim | 280/433 |
| 5,207,444 | 5/1993 | Tydeman | 280/441 |
| 5,263,856 | 11/1993 | Huehn et al. | 384/421 |
| 5,431,424 | 7/1995 | Colwell | 280/433 |

FOREIGN PATENT DOCUMENTS

| | | | |
|---|---|---|---|
| 667055 | 9/1988 | Switzerland | 280/433 |

Primary Examiner—Kevin T. Hurley
Attorney, Agent, or Firm—Price, Heneveld, Cooper, DeWitt & Litton

[57] ABSTRACT

A fifth wheel hitch having a fifth wheel hitch plate with a bifurcated rear portion defining a kingpin-receiving mouth, throat and latch, an upper surface and an upstanding peripheral rim defining a pocket over substantially all of the hitch plate, a plurality of lubricious polymeric pads filling the pocket, specially configured to interfit and form a bearing surface over substantially all of the hitch plate, the pads each comprising a steel underlayer having a bottom surface on the hitch plate and having a top surface, and a lubricious polymeric overlayer bonded on the top surface of the steel underlayer and extending above the rim, the hitch plate having a pattern of a plurality of vertical, fastener-receiving orifices extending therethrough, a plurality of threaded studs having upper ends stud welded to the steel underlayer bottom surface, positioned to correspond to the pattern of orifices in the hitch plate and having lower ends extending down through the orifices, and a plurality of fastener nuts on the lower ends of the studs for securing the pads to the hitch plate. The configured pads are preferably in a group of three, with two of them being mirror images of each other on opposite sides of the hitch, or in a group of six, with four of them being mirror images of each other on the same side and on opposite sides of the hitch, and the remaining two being mirror images of each other.

8 Claims, 3 Drawing Sheets

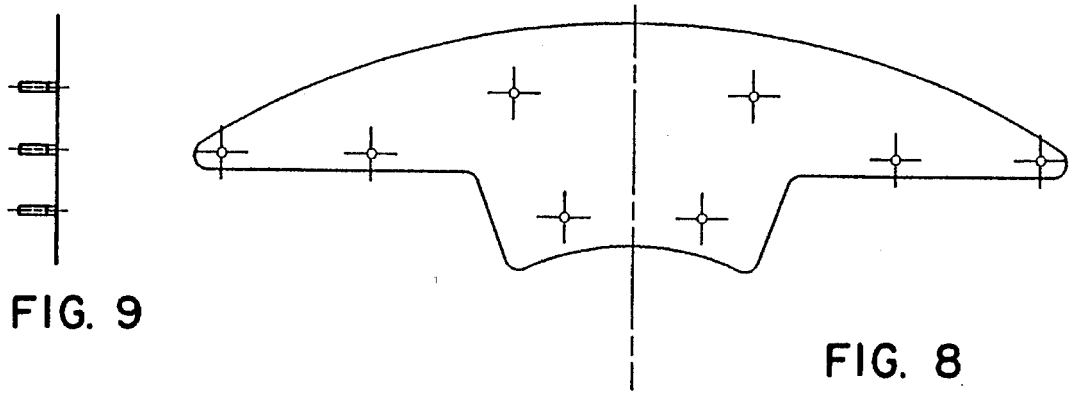
FIG. 9
FIG. 8
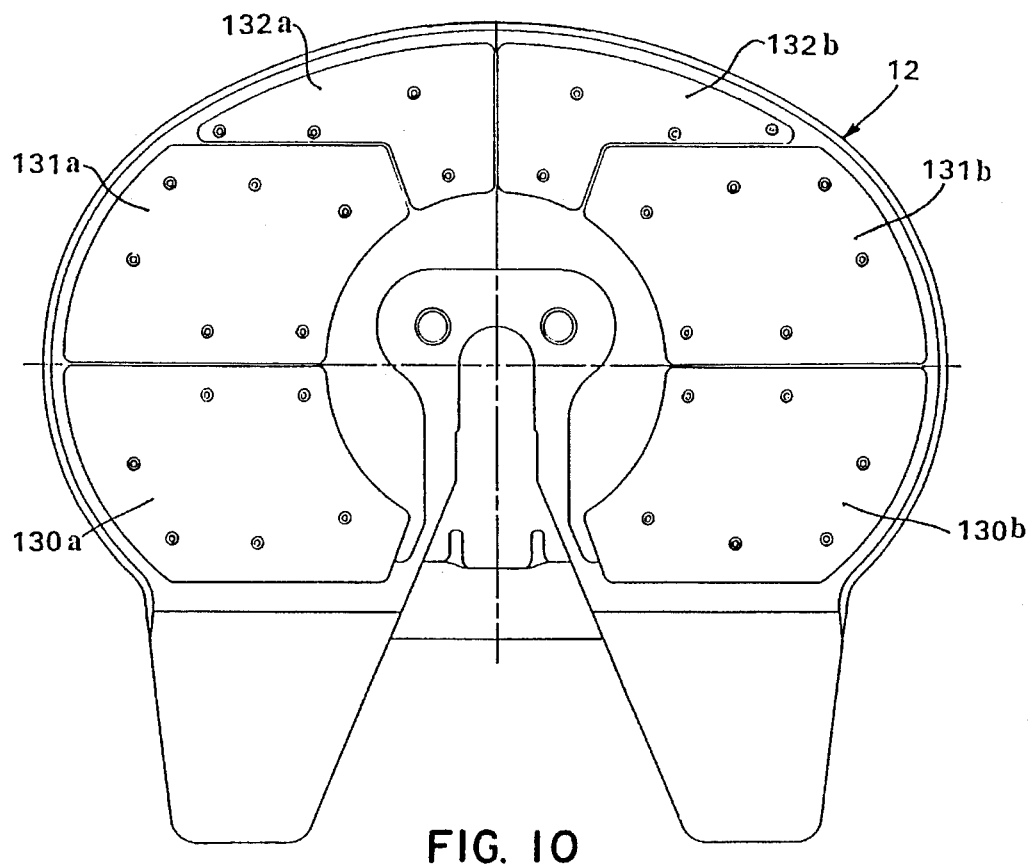
FIG. 10

5,522,613

SELF LUBICATING FIFTH WHEEL HITCH

BACKGROUND OF THE INVENTION

This invention relates to fifth wheel hitches and particularly to a low lube fifth wheel hitch assembly.

A common hitch for hauling large trailers is the well-known fifth wheel hitch which has a large bifurcated bearing plate that receives a kingpin and locks it in place with one or more jaws. The kingpin is mounted on a trailer which also has a bearing plate which rests upon and pivots on the hitch upper surface, to enable articulation between the trailer and its towing tractor. This pivotal action is typically aided by a layer of grease on the hitch surface. Because this grease is not only messy but also tends to retain dirt and dust which cause wear, it is undesirable.

Various attempts have been made in the past to provide a lubricious surface layer for the hitch without the extensive amount of grease normally required. These efforts are believed to be largely set forth or represented by U.S. Pat. Nos. 5,263,856 to Huehn et al; 3,174,812 to Widmer; 3,704,924 to Lowry; 3,275,390 to Franks; 5,066,035 to Athans et al; 3,924,909 to Kent et al; 4,121,853 to McKay; 4,169,635 to Szalay et al; 4,457,531 to Hunger; 4,542,912 to St. Louis; 4,752,081 to Reeners et al; and 4,805,926 to Mamery. Many of these would require total redesign of the hitch. Others involve fastening devices undesirably exposed on the top of the lubricious material. Some have the lubricious layer rather permanently mounted to the hitch so that replacement of a worn product is extremely difficult and costly. Structures such as in U.S. Pat. No. 3,174,812 require special cavities in the fifth wheel, and only provide a small bearing surface area considered inadequate. As a consequence of these and related shortcomings, fifth wheel hitches in use still basically comprise the well-known grease coated metal plate.

SUMMARY OF THE INVENTION

An object of this invention is to provide a fifth wheel hitch having specially configurated, interfitting lubricious pads mounted onto the hitch plate covering substantially all of the bearing surface, yet arranged to enable each pad to perform independently to a degree allowing localized "stick-slip" motion between that lubricious pad and the overlying trailer bearing plate. Lubricious polymer layer segments to form replaceable segmental pads are bonded to like configurated segmental steel backing plates. Threaded studs are stud-welded to the backing plates, projecting only from the bottom thereof, the studs extending down through orifices in the hitch plate for securement to the hitch plate by nuts. The segmental, interfitting pads are in groups of three or six, with lateral pads being in mirror image arrangement and a cooperative, overlapping forward pad or pair of mirror-image forward pads, the latter having a stem portion that extends between the lateral pads, and having a forward cross portion that overlaps the lateral pads.

The interfitting group of individual pads is retained within and protrudes above a peripheral upstanding rim. Each pad is able to transfer torsional loading to an adjacent pad and then to the peripheral rim, for cooperative mutual support, yet allowing independent surface-to-surface action between each pad and the trailer bearing plate. In the event of an overturning load, the peripheral rim provides support structure to support the concentrated load, preventing significant crushing of the lubricious pad element.

The upper surface of the novel structure is free of exposed fasteners which could cause dirt accumulation, corrosion, reduction of pad strength and reduction of maximum useful beating surface area. The individual pads can be selectively removed and replaced. Moreover, a minimum of molds is needed to form the polymeric pad elements.

These and other objects, advantages and features of the invention will become apparent upon studying the following specification in conjunction with the drawings.

BRIEF DESCRIPTION OF THE DRAWINGS

FIG. 8 is a plan view of the forward steel underplate for the forward pad assembly, showing the location of the stud-welded stud fasteners;

FIG. 9 is a side elevational view of the underplate in FIG. 8; and

FIG. 10 is a plan elevational view of the fifth wheel hitch in FIG. 1, but utilizing a six pad arrangement in place of the three pad arrangement.

DESCRIPTION OF THE PREFERRED EMBODIMENTS

Figure 1:
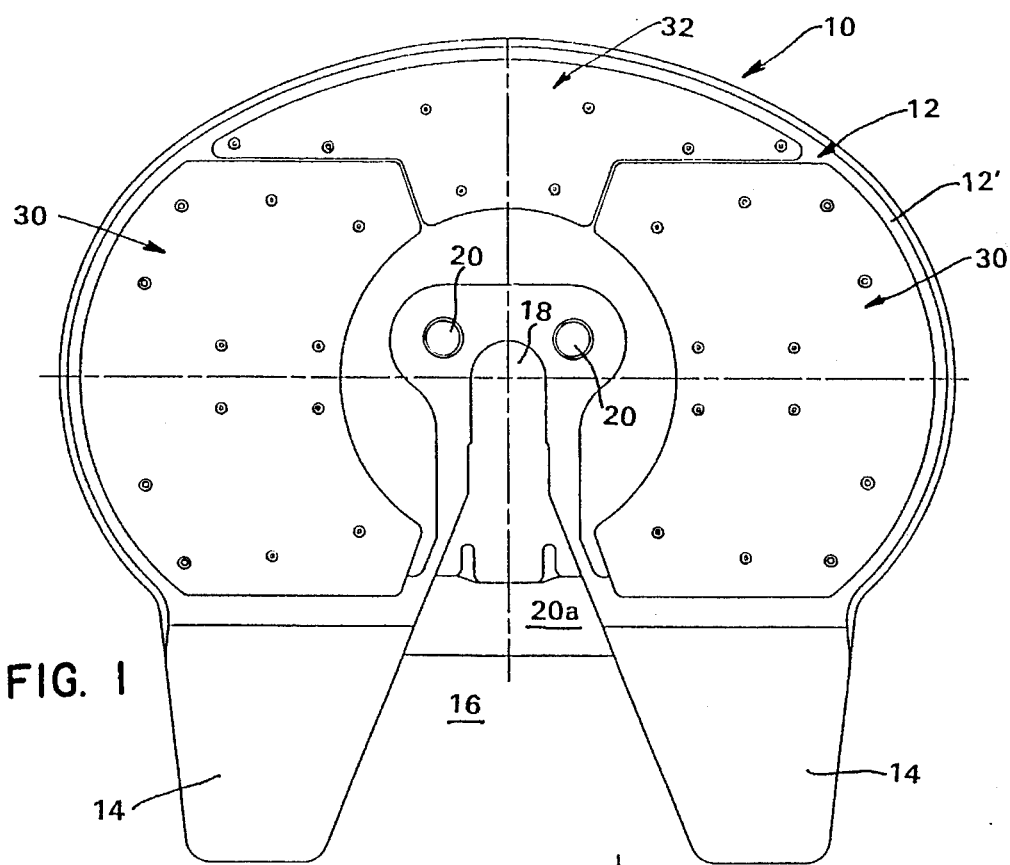
FIG. 1 is a top plan view of the hitch of this invention, utilizing a three pad arrangement.
Figure 3:
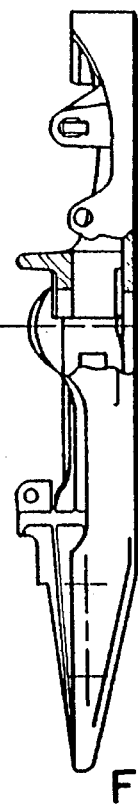
FIG. 3 is a side elevational view of the structure in FIG. 2.
Figure 2:
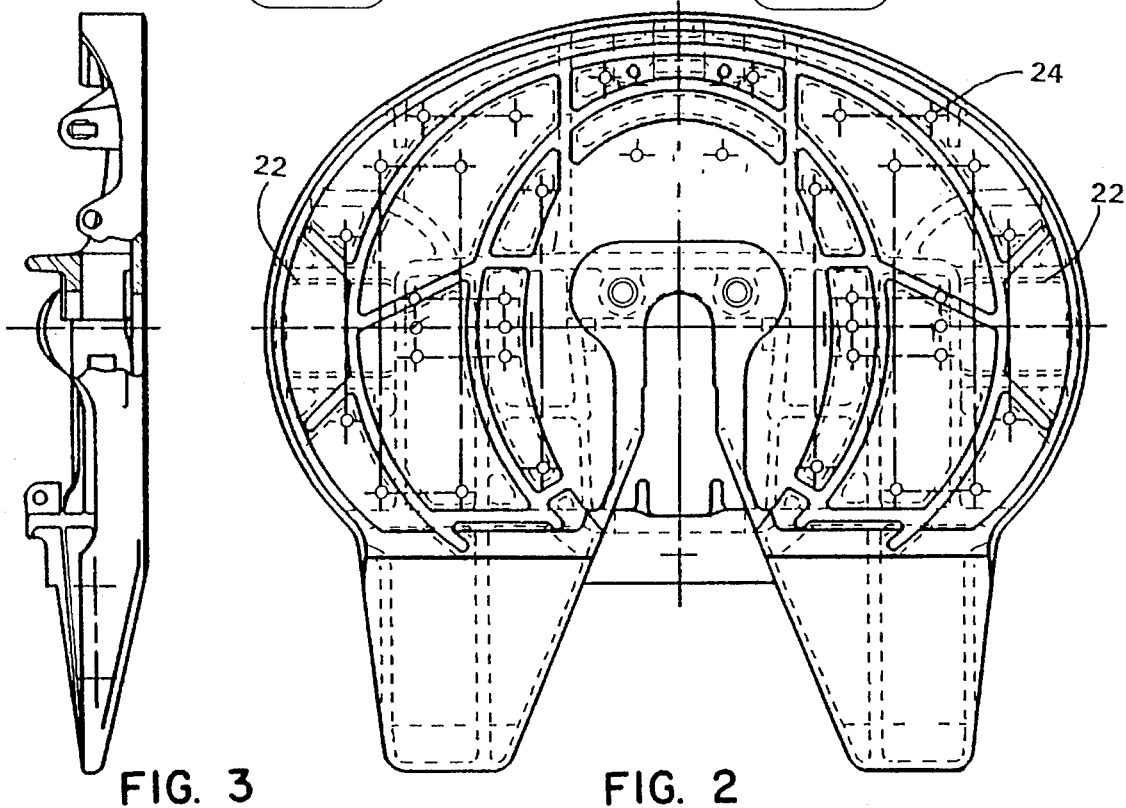
FIG. 2 is a top plan view of the hitch in FIG. 1, prior to mounting of the lubricious pad assemblies thereon.
Figure 5:
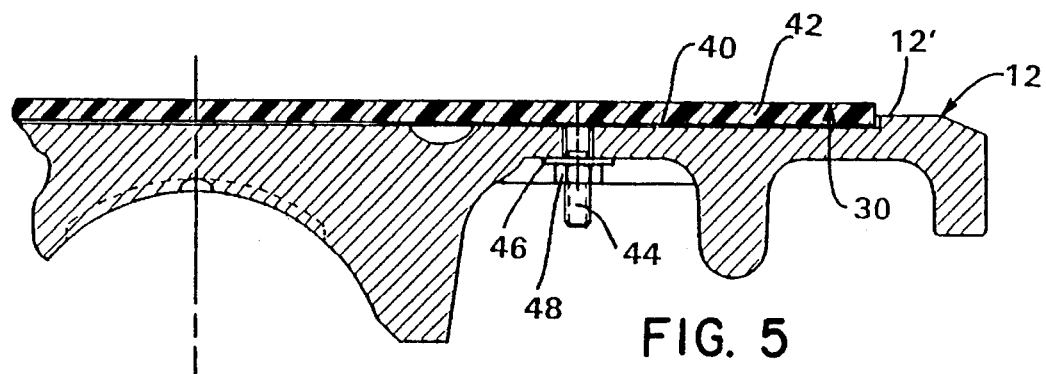
FIG. 5 is an enlarged, fragmentary, sectional, elevational view comparable to FIG. 4, but with the lubricious pad structure mounted thereon.
Figure 4:
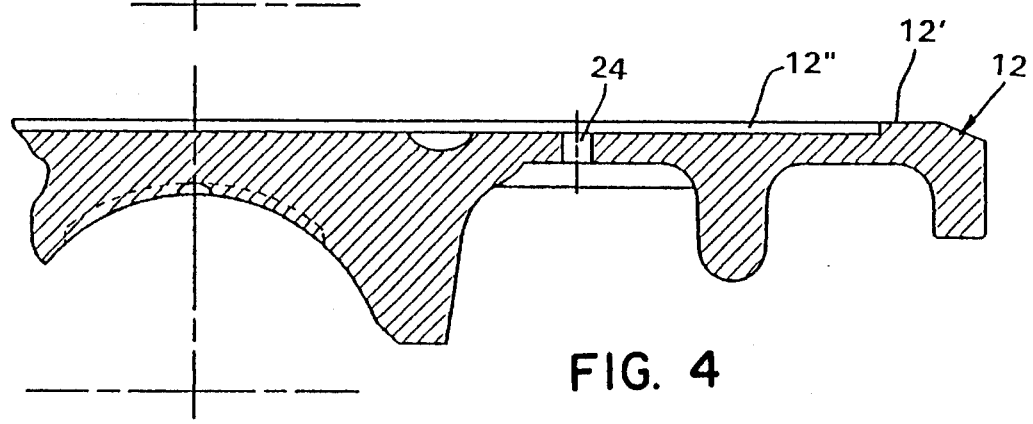
FIG. 4 is an enlarged, fragmentary, elevational, sectional view of the hitch in FIGS. 2 and 3.

Referring now specifically to the drawings, the fifth wheel hitch assembly 10 depicted in FIGS. 1–9 comprises a fifth wheel hitch plate 12 having a bifurcated rear portion which forms laterally spaced ramps 14 astraddle a kingpin receiving mouth 16 and throat 18. In the hitch shown, a pair of jaws such as those shown in U.S. Pat. No. 4,428,595, issued Jan. 31, 1984, and entitled FIFTH WHEEL HITCH, incorporated by reference herein, are mounted on pivot pins 20 to pivot thereon and lock a conventional depending kingpin (not shown) on a trailer within throat 18 until purposely released. This hitch has an upstanding peripheral rim 12' extending around both sides and the forward end of the hitch, defining a pocket 12" (FIG. 4) in the top of the hitch plate. A lower, transverse, reinforcing beam 20a extends across the mouth 16 below the level of the entering kingpin, in conventional fashion. The opposite sides of plate 12 are mounted on bearing trunnions 22 in conventional fashion, to pivot forwardly and rearwardly on a transverse pivot axis. Hitch plate 12 has an overall pattern of orifices 24 (FIG. 2) extending through the thickness of the plate.

Shown in FIG. 1 to be mounted on hitch plate 12 are specially configurated, interfitting and cooperative lubricious pad subassemblies, with a pair of them 30 being on opposite lateral sides of the mouth and throat of the plate, and the third one 32 being a forward, generally T-shaped lubricious pad subassembly. The two pads 30 are basically in minor-image relationship, having the same arcuate curvilinear configuration which arcs around the mouth and throat area and radially extends to the outer edge of pocket 12", i.e., out to rim 12'. The T-shaped pad subassembly 32 has lateral portions which overlap pad subassemblies 30 to form the cross member of the T, and a second portion protruding rearwardly between them to form the stem of the T, in a generally T-shaped configuration. The pocket, and also the three pad subassemblies, cover substantially all of the fifth wheel hitch plate.

Each of the pad subassemblies 30 depicted (FIG. 5) includes a steel underplate 40 having an upper surface and a lower surface. Bonded to the upper surface of steel plate 40 is a lubricious layer 42, the lower surface of which is below the level of peripheral rim 12'. Steel plate 40 is preferably of a rolled steel of a thickness within the range of about 0.030 to 0.125 inch. A plurality of threaded studs 44 are stud-welded at their upper ends to the bottom surface of plate 40. These studs are arc welded in position in a pattern on the individual pads corresponding to portions of the overall pattern of orifices 24 in plate 12, to enable the studs to project down through the hitch plate for securement by a washer 46 and nut 48 on each stud.

Lubricious layer 42 is of sufficient thickness to project above peripheral rim 12', i.e., have its upper bearing surface above the rim. Its upper surface is nonperforate. The layer may be any of several lubricious materials, typically containing or comprising a polymeric material, preferably nylon reinforced with embedded glass fibers or polytetrafluoroethylene embodied in a sintered matrix. The lubricious layer may be molded onto the underplate to be bonded in situ, or applied as a prefabricated layer and bonded to the underplate as by an adhesive. The lubricious layers require only two mold configurations to form them since the layers for lateral pads 30 are simply the inverted form of each other.

Figure 6:
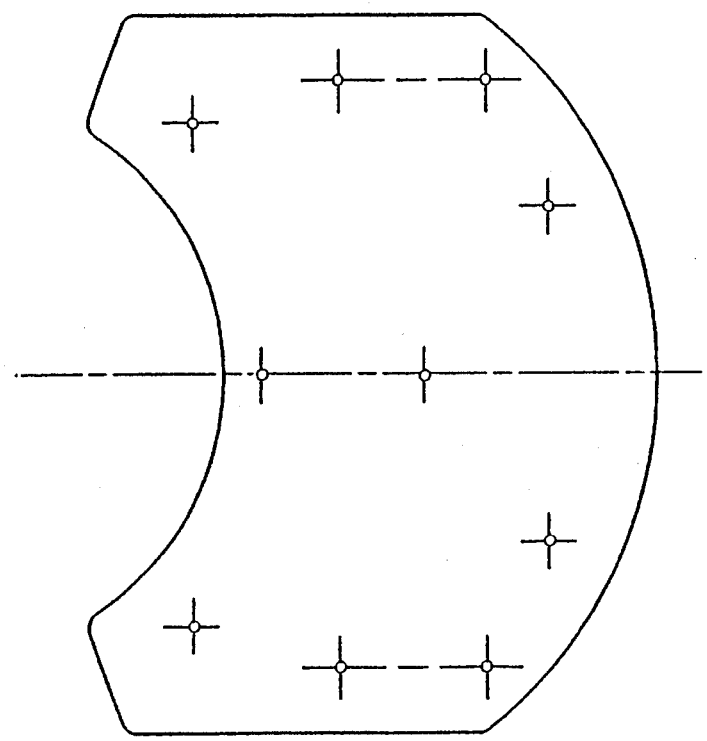
FIG. 6 is a plan view of one of the lateral steel underplates, showing the location of the stud-welded stud fasteners.
Figure 7:
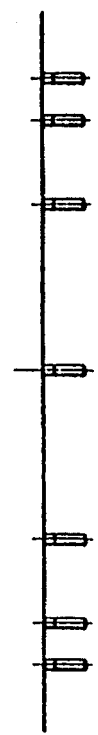
FIG. 7 is an edge elevational view of the structure in FIG. 6.

With reference to FIG. 6, the stud pattern there depicted represents either the bottom side of the left-hand underplate, or broken line locations of the stud pattern viewing the top side of the right-hand underplate. FIG. 8 represents the stud pattern when considered from the bottom of the underplate, or in broken line locations viewing the top of the underplate.

In FIG. 10 is depicted an alternative embodiment which employs six pad subassemblies rather than three as in the earlier embodiment. In this structure, the fifth wheel plate 12 is the same as that previously described relative to the embodiment in FIG. 1. The pads are configured in the same overall assembly pattern as previously shown and described, the stud pattern preferably being comparable and the orifice pattern in hitch plate 12 being the same as in the first embodiment. In this instance, however, instead of individual pad subassemblies 30 and 32, there are three pairs of mirror image twin pads 130*a* and 130*b*, 131*a*, 131*b*, and 132*a* and 132*b*. Again, there will only be two basic mold shapes required for all of the molded individual lubricious layers since the configuration of pads 130*a* and 131*b* is the same, only rotated 180° in the same plane, the configuration of pads 130*b* and 131*a* is the same, only rotated 180° in the same plane, and 130*a* and 130*b*, as well as 131*a* and 131*b* are mirror images of each other, i.e., inverted, as well as the pads 132*a* and 132*b* being mirror images of each other, i.e., inverted. Therefore, only two molds need be used to form the pads, one for 130*a*, 130*b*, 131*a* and 131*b*, and the second for 132*a* and 132*b*. Conceivably, the two forward pads 132*a* and 132*b* could be substituted by the one forward pad 32 of the first embodiment.

Using either of the embodiments, mounting of the interfitting pad subassemblies is simple, namely placing the two layer pads in position with the studs extending down through the openings and fastening the nuts in position to retain them on the hitch plate. Replacement of the pads, either individually or collectively, is also easy to accomplish by removing nuts 48 from studs 44, lifting any worn pad subassemblies from the hitch plate, and replacing them with new ones.

The interfitting arrangement of the pads with each other and the peripheral rim enables the pads and rim to collectively, cooperatively withstand excessive shear loads and/or torsional loads, yet each pad is able to perform independently in the surface-to-surface relationship with the overlying trailer bearing plate to a degree enabling localized "stick-slip" motion characteristics of friction relationship between the polymer of the pad surface and the metal of the overlying trailer bearing plate.

Those skilled in this field may readily visualize variations and modifications to be made in the structure depicted, to suit a particular circumstance or environment. It is not intended that the scope of the invention is to be limited by the preferred embodiments set forth as exemplary of the invention, but only by the scope of the appended claims and the reasonably equivalent structures to those defined therein.

The embodiments of the invention in which an exclusive property or privilege is claimed are defined as follows:

1. A fifth wheel hitch comprising:

a fifth wheel hitch plate having a bifurcated rear portion defining a kingpin-receiving mouth, throat and latch, an upper surface, and including an upstanding peripheral rim defining a pocket;

said pocket extending over substantially all of said hitch plate;

a plurality of lubricious polymeric pads filling said pocket;

said pads having configurations interfitting with each other and with said rim to form a bearing surface over substantially all of said hitch plate, while allowing each pad to independently form a stick-slip surface relationship with an overlying trailer bearing plate;

said pads each comprising a steel underlayer having a bottom surface on said hitch plate and having a top surface, and a lubricious polymeric overlayer bonded to said top surface of said steel underlayer;

said lubricious polymeric overlayer of said pads extending above said peripheral rim;

said hitch plate having a pattern of a plurality of vertical, fastener-receiving orifices extending therethrough;

a plurality of studs having upper ends extending down from said steel underlayer bottom surface, positioned to correspond to said pattern of orifices in said hitch plate and having lower ends extending down through said orifices;

said studs being threaded studs having upper ends stud-welded to said steel underlayer bottom surface; and a plurality of fasteners on said lower ends of said studs for securing said pads to said hitch plate, said fasteners being threaded nuts.

2. The fifth wheel hitch in claim 1 wherein said lubricious overlayer of said pads is imperforate.

3. A fifth wheel hitch comprising:

a fifth wheel hitch plate having a bifurcated rear portion defining a kingpin-receiving mouth, throat and latch, an upper surface, and including an upstanding peripheral rim defining a pocket;

said pocket extending over substantially all of said hitch plate;

a plurality of lubricious pads filling said pocket;

said pads having configurations interfitting with each other and with said rim to form a bearing surface over substantially all of said hitch plate, while allowing each pad to independently form a stick-slip surface relationship with an overlying trailer bearing plate;

said pads each comprising an underlayer plate having a bottom surface on said hitch plate and having a top surface, and a lubricious overlayer bonded to said top surface of said underlayer plate;

said lubricious overlayer of said pads extending above said peripheral rim; and a plurality of fasteners between said underlayer plate and said hitch plate, said fasteners being threaded studs having upper ends stud-welded to said underlayer bottom surface.

4. The fifth wheel hitch in claim 3 wherein said lubricious overlayer of said pads is imperforate.

5. The fifth wheel hitch in claim 4 wherein said lubricious overlayer of said pads is imperforate.

6. A fifth wheel hitch comprising:

a fifth wheel hitch plate having a bifurcated rear portion defining a kingpin-receiving mouth, throat and latch, and an upper surface;

a plurality of lubricious pads over said hitch plate upper surface;

said pads forming a bearing surface over said hitch plate;

said pads each comprising an underlayer plate having a bottom surface on said hitch plate and having a top surface, and a lubricious overlayer bonded to said top surface of said underlayer plate;

said lubricious overlayer of said pads forming said bearing surface; and a plurality of fasteners between said underlayer plate and said hitch plate, said fasteners being threaded studs having upper ends stud-welded to said underlayer bottom surface.

7. The fifth wheel hitch in claim 6 wherein said lubricious overlayer of said pads is imperforate.

8. A fifth wheel hitch comprising:

a fifth wheel hitch plate having a bifurcated rear portion defining a kingpin-receiving mouth, throat and latch, and an upper surface;

a plurality of lubricious polymeric pads over said hitch plate upper surface;

said pads forming a bearing surface over said hitch plate;

said pads each comprising a steel underlayer having a bottom surface on said hitch plate and having a top surface, and a lubricious polymeric overlayer bonded to said top surface of said steel underlayer;

said hitch plate having a pattern of a plurality of vertical, fastener-receiving orifices extending therethrough;

a plurality of studs having upper ends extending down from said steel underlayer bottom surface, positioned to correspond to said pattern of orifices in said hitch plate and having lower ends extending down through said orifices;

said studs being threaded studs having upper ends stud-welded to said steel underlayer bottom surface;

a plurality of fasteners on said lower ends of said studs for securing said pads to said hitch plate; and said fasteners being threaded nuts.

* * * * *

UNITED STATES PATENT AND TRADEMARK OFFICE
CERTIFICATE OF CORRECTION

PATENT NO. : 5,522,613
DATED : June 4, 1996
INVENTOR : John P. Heeb

It is certified that error appears in the above-identified patent and that said Letters Patent is hereby corrected as shown below:

Column 2, line 4;

"beating" should be --bearing--.

Column 3, line 2;

"minor-image" should be --mirror-image--.

Signed and Sealed this

Eighth Day of October, 1996

BRUCE LEHMAN .

Attest:

Attesting Officer

Commissioner of Patents and Trademarks